United States Patent [19]

St. John

[11] Patent Number: 4,631,576
[45] Date of Patent: Dec. 23, 1986

[54] NONUNIFORMITY CORRECTION SYSTEM FOR COLOR CRT DISPLAY

[75] Inventor: Karl M. St. John, Huntington Station, N.Y.

[73] Assignee: Hazeltine Corporation, Commack, N.Y.

[21] Appl. No.: 671,137

[22] Filed: Nov. 13, 1984

[51] Int. Cl.⁴ .................. H04N 9/20; H04N 9/16; H04N 5/243; H04N 5/68

[52] U.S. Cl. .................................. 358/65; 358/64; 358/163; 358/242

[58] Field of Search .................. 358/10, 29, 56, 64, 358/65, 66, 163, 242

[56] References Cited

U.S. PATENT DOCUMENTS 4,473,844 9/1984 Klein .................................. 358/163
4,581,655 4/1986 Ide et al. ........................... 358/163

FOREIGN PATENT DOCUMENTS 115021 9/1979 Japan ..................................... 358/29
51676 3/1983 Japan ..................................... 358/163

Primary Examiner—James J. Groody
Assistant Examiner—Randall S. Svihla
Attorney, Agent, or Firm—E. A. Onders; F. R. Agovino

[57] ABSTRACT

A system for the correction of nonuniformities in both color and brightness as provided for the correction of such nonuniformities in a color CRT display. The system employs correction signals which are obtained by photographing a white screen of the display at maximum brilliance. These correction signals are then added to video signals during normal operation of the display for presenting image data provided by the video signals. In the absence of any video signal, the full value of the correction signals is applied to the display. For increased amounts of video signal which cut back varying amounts of the primary colors of red, green, and blue, the correction signals are reduced in magnitude so as to provide a smaller contribution at the input video terminals of the display. Thereby, correction can be obtained over a range of varying values of intensity.

9 Claims, 5 Drawing Figures

NONUNIFORMITY CORRECTION SYSTEM FOR COLOR CRT DISPLAY

BACKGROUND OF THE INVENTION

This invention relates to displays and, more particularly, to electrical circuitry for the correction of nonuniformity in a cathode ray tube (CRT) having red, green, and blue phosphors for presenting an image in color.

CRTs are widely used for the presentation of data in many forms. In some applications, it is important to present the data with high accuracy in respect to both the color and the brightness of the data. For example, CRT's which are used for previewing or color correction must provide accurate color presentation. In particular, the display of a white screen should show no coloring or hues.

Color CRT's are usually constructed with three electron guns which direct electron beams respectively at red, green, and blue phosphors located on the viewing screen. Modulation of the intensity of these beams shifts a region of the display from a uniform white to a color, and also changes the brightness of the screen. An apertured mask is placed between the screen and the guns, the apertures guiding a bundle of three beams simultaneously to the requisite phosphors. An electromagnetic coil or yoke scans the bundle of the three beams across the screen. Red, green, and blue video signals are applied to electrodes of the respective guns for modulation of the intensities of the respective beams.

A problem arises in that, as a result of the manufacturing process, some nonuniformity results from insufficient levels of cleanliness or irregularities in the size of the phosphor dots and possibly in the apertured mask. There results a nonuniformity in the display which, while possibly being acceptable for situations such as the home-viewing of movies, is excessively troublesome where accurate presentation is required.

SUMMARY OF THE INVENTION

The foregoing problem is overcome and other advantages are provided by a calibration and nonuniformity correction system which, in accordance with the invention, introduces correction signals which are combined with the red, green, and blue video signals. The correction signals are obtained by photographing the display by a television camera three times, one time for each of the primary colors red, green, and blue. Any deviations from uniformity, as a function of location on the display screen, is expressed as a correction signal, which signal is the ratio of the observed signal to a reference signal.

In use of the display, the video signals are altered in amplitude, as a function of location on the display, to compensate for the nonuniformity. The alteration in amplitude is accomplished by summing a correction term with the video, the correction term varying in amplitude from zero for a dark display to maximum for maximum brilliance in the absence of a video signal.

The variation in the amplitude of the correction term for any one of the primary colors is attained by scaling the correction signal by a scale factor equal to the difference between a reference voltage and the video voltage for the corresponding primary color. In the special case of a relatively dark screen which follows a light screen, the video signals are close to their maximum amplitudes and the scaling factors, accordingly, are near zero; thus, the video signals are applied to their respective guns with little alteration by the corrective terms. In the general case of a relatively bright screen, one or more of the video signals are close to their minimum values; thus, the corresponding correction signals are scaled by near-maximum values of scale factors. Accordingly, for a bright screen, each corrective term constitutes substantially all of the signal applied to its corresponding electron gun.

It is, therefore, an object of the invention to correct the nonuniformity of a CRT color display by the introduction of correction signals.

It is a further object of the invention to modify the correction signals in accordance with the amplitude of respective ones of the video signals prior to application of the correction signals to the display, so as to enable the correction signals to be used for screens of varying brightness.

BRIEF DESCRIPTION OF THE DRAWINGS

The foregoing aspects and other features of the invention are explained in the following description taken in connection with the accompanying drawings wherein.

DETAILED DESCRIPTION OF THE INVENTION

Figure 1:
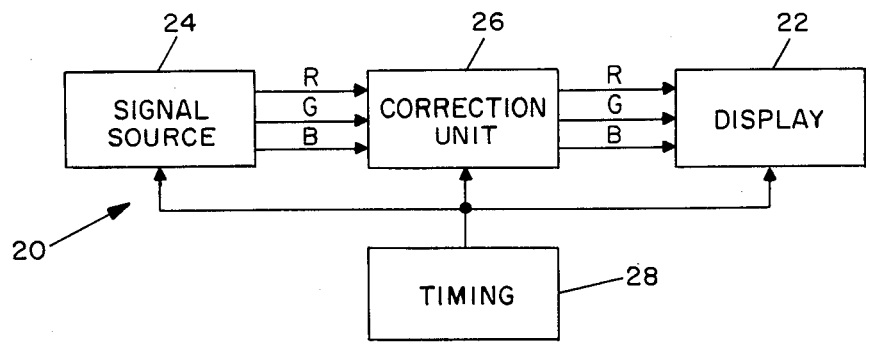
FIG. 1 is a block diagram of a system incorporating the invention for correction of nonuniformity of a color CRT display.

FIG. 1 shows a system 20 which incorporates the invention for correction of nonuniformity of both color and brightness in a CRT display 22. A signal source 24 provides red, green, and blue video signals for driving the red, green, and blue electron guns of the display 22. In the absence of video signals, the display 22 shows a bright white screen associated with maximum brilliance of all the primary colors red, green, and blue. Introduction of a video signal of any one color reduces the intensity of that color on the display screen and shifts the presentation of the screen from white to a colored presentation. The system 20 further comprises a correction unit 26 for combining correction signals with the video signals prior to the application of the video signal to the display 22. As will be explained hereinafter, the correction signals are obtained initially from a bright display. The signals are scaled inversely with the magnitude of the respective video signals resulting in correction of the uniformity of the display 22 under conditions of varying brightness. A timing unit 28 synchronizes the respective operations of the source 24, the correction unit 26 and the display 22.

Figure 2:
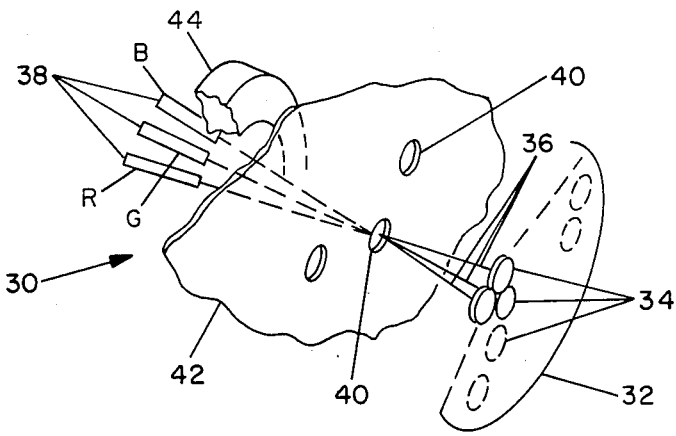
FIG. 2 is a stylized view of a portion of a CRT showing a bundle of electron beams impinging on a set of phosphors.

In FIG. 2, there is provided a stylized view of a portion of a color CRT 30 as is used in the display 22 to demonstrate the causes of the nonuniformity in color and in brightness. The CRT 30 includes a screen 32 having phosphors 34 thereon. A group of three contiguous phosphors 34 is shown in heavy lines and comprises a set of red, green, and blue phosphors which generate light in response to electron beams 36 directed upon the respective phosphors by a corresponding set of red, green, and blue electron guns 38. The beams 36 are transmitted as a bundle of beams through an aperture 40 in a mask 42. The relative angulations of the beams 36 through the aperture 40 provide for the direction of the beams upon the corresponding ones of the phosphors 34. A separate aperture 40 is used with each three-color group of three contiguous phosphors 34. A magnetic deflection yoke 44 scans the bundle of beams 36 across the screen 32 for the generation of an image thereon. The data presented in the image is provided by modulation of the beams 36 by the video signals. Uniformity in the color and brightness of the image is dependent on the precision in the shaping and the positioning of the apertures 40 and the amount of phosphor material deposited at each site of phosphor on the screen 32. Variations in the manufacturing tolerances in the construction of the foregoing parts of the CRT 30 introduce nonuniformities which are to be compensated by the system 26 for correction of the presentation on the display 22.

Figure 3:
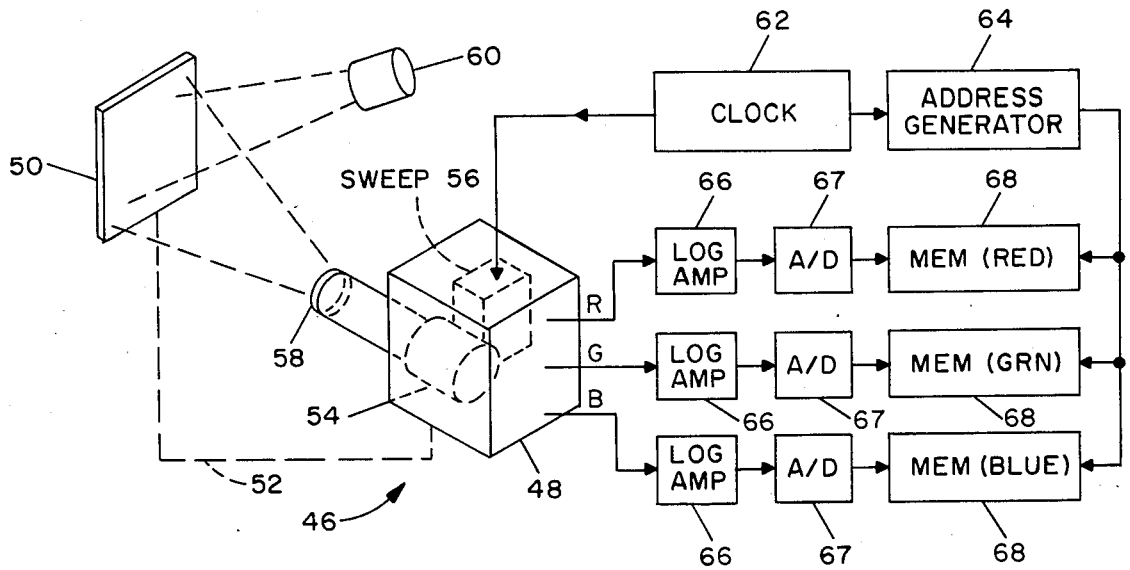
FIG. 3 is a diagrammatic presentation of the process and equipment used in calibrating a television camera employed in generating correction signals for the system of FIG. 1.

With reference to FIG. 3, there is shown equipment 46 utilized in the generation of correction signals for use by the correction unit 26 of FIG. 1. The equipment 46 comprises a television camera 48 pointing towards a subject 50 rigidly positioned relative to the camera 48 by a support 52 which is indicated diagrammatically. The camera 48 incorporates a vidicon 54 and sweep unit 56 for scanning the electron beams in the vidicon 54. A lens assembly 58 is secured to the front end of the vidicon 54 for focusing and magnifying the subject 50 to the desired size for filling a predetermined region of the viewing surface of the vidicon 54. The subject 50 is a white card which is uniformly illuminated by a source 60 of white light. Also included in the equipment 46 is a clock 62, an address generator 64, three logarithmic amplifiers 66 which are employed respectively for the red, green, and blue output channels of the vidicon 54, three analog-to-digital converters 67, and a set of three memories 68 which are used respectively for the red, green and blue output channels of the vidicon 54.

In operation, the camera 48 photographs the subject 50. Since the subject is white, the three output channels of the vidicon 54 provides, ideally, three equal-amplitude video signals, respectively, the red, green and blue video signals. These signals are coupled via the amplifiers 66 to the memories 68 wherein the video signals are stored. The clock 62 strobes the sweep unit 56 and the address generator 64, the latter addressing the memories 68 for receipt and storage of the video signals. The clock 62 maintains synchronism between the addressing of the memories 68 and the operation of the sweep unit 56 so that each location in memory corresponds to an image point on the photograph of the subject 50. In particular, it is noted that the values of signals stored in the memories 68 correspond to those actually produced by the vidicon 54. In the event that there is any nonuniformity in the operation of the camera 48, such nonuniformity will appear among the stored signals in the memories 68. Since the subject 50 has been selected for its uniformity, any lack of uniformity among the signals stored in the memories 68 is due to the presence of a nonuniformity in the camera 48.

With respect to the storage of the signals in the three memories 68, it is noted that such data storage can be accomplished one channel at a time or, alternatively, by storage of the signals of three channels simultaneously (not shown). In the event that the camera 48 is peculiarly sensitive to certain portions of the spectrum, then it is preferable to operate the source 60 with filters for sequential illumination by red, green, and blue light, and a set of switches (not shown) would be used for coupling only the corresponding one of the output channels of the camera 48 through the amplifiers 66. As a practical matter, it has been found that the camera 48 utilized in a preferred embodiment of the invention did not have any variation in spectral sensitivities. Accordingly, the subject 50 has been illuminated with white light from the source 60, and each output channel of the camera 48 provides a video signal to the amplifiers 66 and memories 68. Alternatively, the video signals can be provided by a voltage source since it has been found that the video signals tend to be in a narrow range and are fairly consistent.

Figure 4:
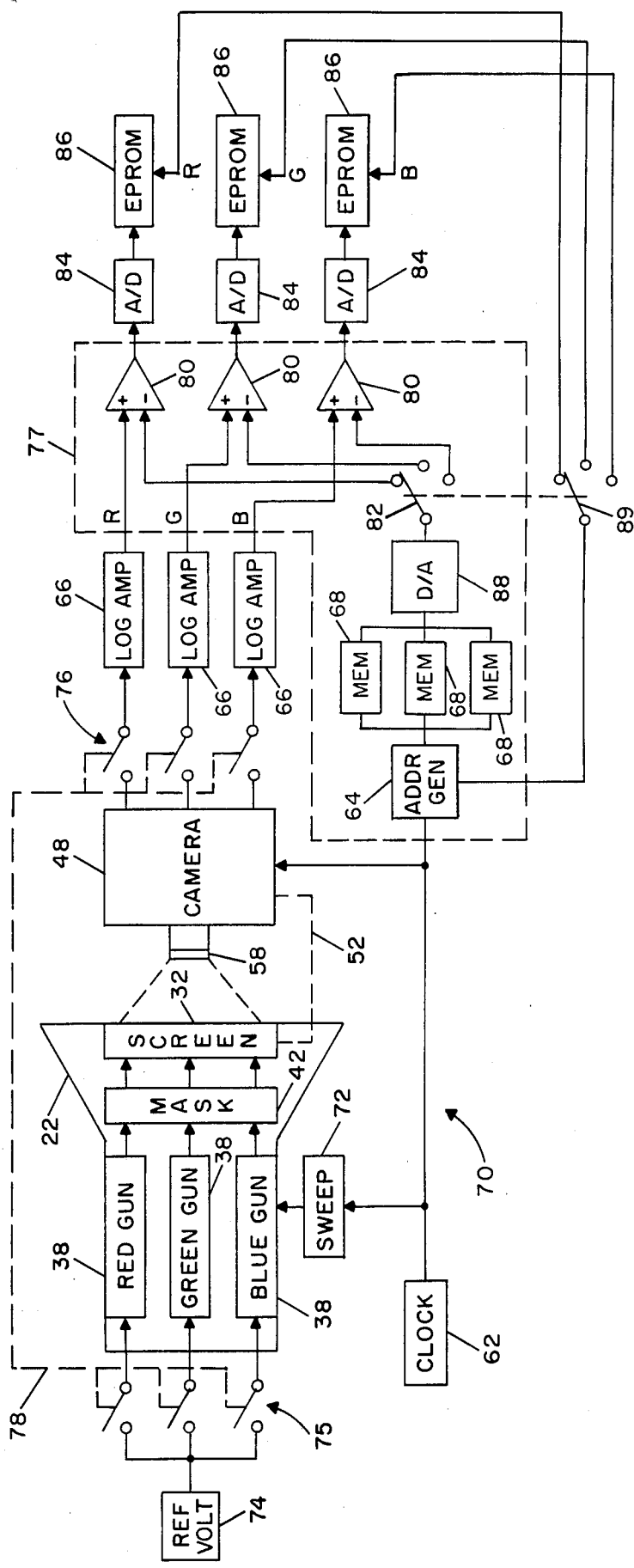
FIG. 4 is a block diagram of equipment used in calibration of the display of FIG. 1 for generating the correction signals.

In FIG. 4 there is shown equipment 70 for accomplishing a further step in the generation of the correction signals for use by the correction unit 26 of FIG. 1. The equipment 70 includes the camera 48, the memories (RAM) 68, the logarithmic amplifiers 66, the address generator 64 and the clock 62 previously described with reference to FIG. 3. The subject 50 of FIG. 3 has been replaced with the display 22 in FIG. 4. Thus, the equipment 70 provides for the photographing of the display 22 (first disclosed in FIG. 1) in a manner corresponding to that disclosed in FIG. 3 for the purpose of storing values of signals which indicate the presence of any nonuniformity. An additional feature in the operation of the equipment 70 is the automatic compensation for any nonuniformities of the camera 48 so that the resulting signals obtained from the photographing of the display 22 do, in fact, accurately represent the presence of any nonuniformities.

The display 22 includes the components of a CRT as has been disclosed hereinabove in FIG. 2, these components being the set of red, green, and blue guns 38, the mask 42, and the screen 32. Also, the display 22 includes a sweep unit 72 for driving a deflection yoke (such as the yoke 44 of FIG. 2) to scan the electron beams of the guns 38.

The equipment 70 further comprises a source 74 of reference voltage, two sets 75 and 76 of three-position, sequentially operated switches which are ganged together as indicated diagrammatically by a dashed line 78, three differential amplifiers 80, a sequentially operated three-position switch 82, three analog-to-digital converters 84, and three memories 86 which are in the form of electronically programmable read-only memories (EPROM).

In operation, the display 22 is illuminated sequentially by the red, green, and blue guns 38 in response to the successive application of a video signal to the respective guns 38 by the switches of the set 75. The video signal is of a constant amplitude in accordance with a preselected value of voltage provided by the source 74. The switches of the switch sets 75, 76 are ganged in accordance with the arrangement wherein the switches carrying red signals are ganged together for simultaneous operation, the switches carrying the green signals are ganged together for simultaneous operation independently of the operation of the red-signal switches, and the switches carrying the blue signals are ganged together for simultaneous operation independently of the operation of the red-signal switches and the green-signal switches of the two switch sets 75, 76. The clock 62 drives the camera 48 and the address generator 64 in the same manner as has been disclosed with reference to FIG. 3. In addition, the clock 62 drives the sweep unit 72 in the synchronism with the sweep unit 56 (FIG. 3) of the camera 48. Thereby, the operation of the display 22 and the operation of the camera 48 are synchronized.

The camera 48 first photographs the screen 32 when illuminated by the red gun, the resulting red video signal being outputted by the red channel of the camera 48 to the corresponding logarithmic amplifier 66 of the red channel. The red switch of the set 76 is closed for coupling the red output signal of the camera 48 to the red amplifier 66. Thereafter, during the photographing of the green screen, the green switch of the set 76 is closed for coupling the green video output to the amplifier 66 of the green channel. The procedure is repeated for the photographing of the blue screen by the closing of the blue switch of the set 76 for coupling the blue video to the amplifier 66 of the blue channel.

The output signals of the logarithmic amplifiers 66 are coupled via the respective ones of the differential amplifiers 80 to the respective ones of the converters 84 to the respective ones of the memories 86. As was pointed out in the explanation of FIG. 3, the data stored in the memories 68 with respect to the camera 48 is stored in the form of logarithmic values. The correction circuitry 77 includes the stored data in the memories 68 which is outputted concurrently with the outputting of the signals from the logarithmic amplifiers 66 to be subtracted from the signals of the logarithmic amplifiers 66 at the amplifiers 80. The amplifiers 66 are connected to the positive input terminals of the respective ones of the amplifiers 80, while the memories 68 are coupled via digital-to-analog converters 88 to the negative input terminals of the respective amplifiers 80 to accomplish the foregoing subtraction.

With respect to the construction of the memories 68, it is noted that the commonly used forms of construction may be employed. For example, in the event that the memories 68 store analog signals directly, as is the case with charged coupled devices, then the analog-to-digital converters 67 (FIG. 3) and the digital-to-analog converters 88 (FIG. 4) would not be required. On the other hand, if the memories 68 store digitized signals as in the case of construction as a random-access memory, then the converters 67 and 88 are required to provide the digitized form of signal for storage, and then to convert the signals back to the analog form for subtraction at the amplifiers 80. Irrespectively as to whether the signals be in the analog or digital form, the use of the logarithmic amplifiers in both FIGS. 3 and 4 provides for the subtraction of the logarithmic values of the signals at the amplifiers 80, this corresponding to a division of the camera signals (FIG. 4) by the reference signals of the memory 68. The logarithms of the quotients appear at the output terminals of the amplifiers 80. Furthermore, correction circuitry 77 is optional and the output of log amplifiers 66 may be directly applied to converters 84. If correction circuitry 77 is not used, a correction voltage 110 must be subtracted from the output of converters 94 (see FIG. 5).

The exponential amplifiers 80 introduce the inverse logarithmic function so as to convert the camera signals back to the usual analog format. The effect of the division by the reference values in the memories 68 is to normalize the camera signals with respect to any nonuniformities that may be present in the camera 48 itself. Thereby, the camera signals appearing at the output terminals of the exponential amplifiers 80 are true representations of the image of the screen 32 of the display 22. With respect to the use of the logarithmic amplifiers 66 and the exponential amplifiers 80, it is noted that these amplifiers are available commercially, and are also available as matched sets so as to provide for an accurate conversion from the analog format to the logarithmic format and back to the analog format. The camera signals at the output terminals of the respective amplifiers 80 are then converted from analog form to digital form by the converters 84 and stored in the memories 86. Thus, the red, green, and blue video signals stored in the memories 86 serve as an accurate representation of the image of the screen 32, including the presence of any nonuniformities. Accordingly, the signals in the memories 86 are in the proper form for use as correction signals in the correction unit 26 of FIG. 1. It is also noted that the addressing of the memories 86 is provided by the address generator 64 through the switches of a switch set 89 as is indicated by the legends R, G and B which identify the respective address terminals of the memories 86. Thereby, the storage locations of the memories 86 correspond to those utilized in the memories 68.

Figure 5:
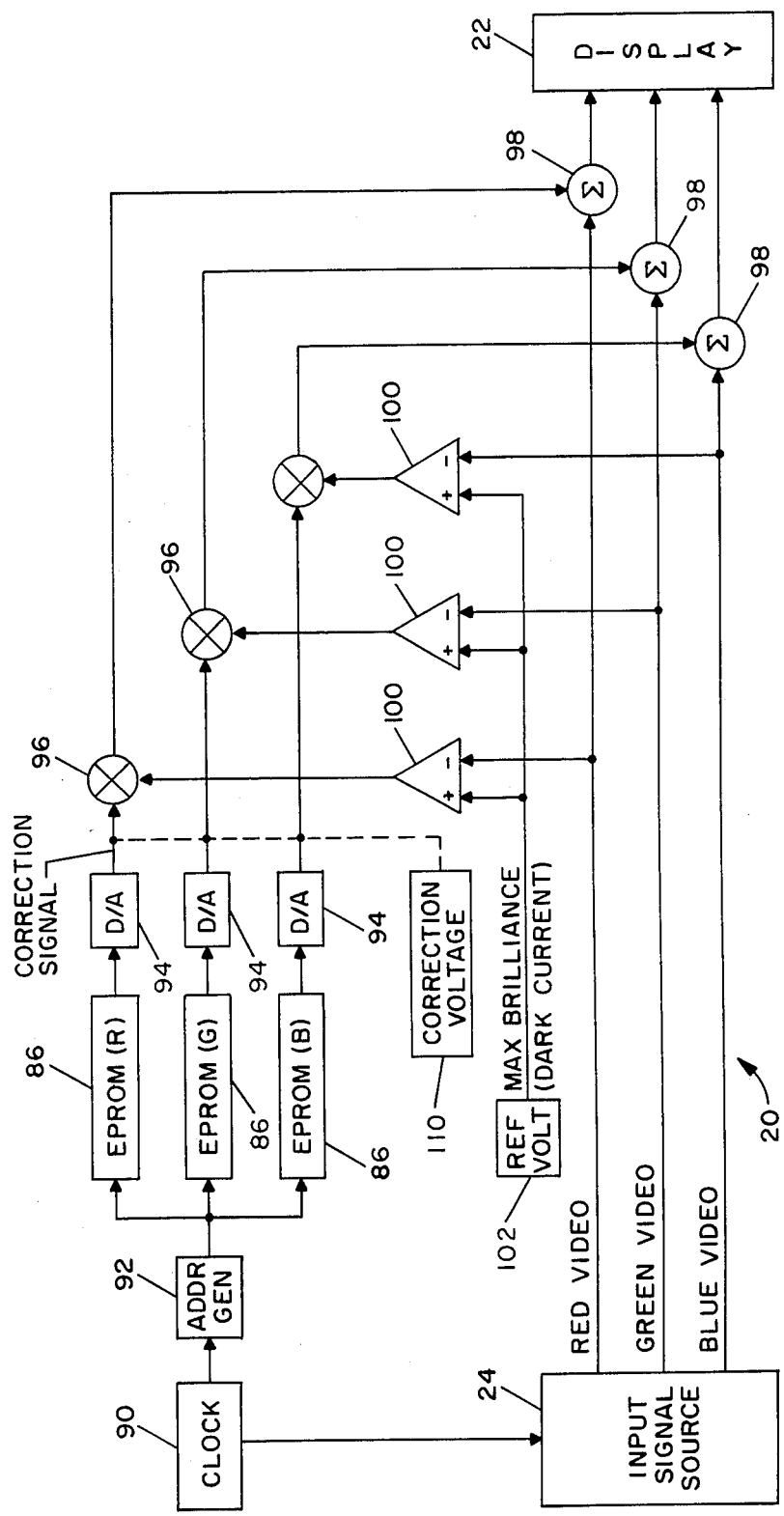
FIG. 5 is a detailed diagram of the system of FIG. 1.

With reference to the diagram of FIG. 5, there is shown a more detailed view of the system 20 of FIG. 1. The diagram of FIG. 5 includes the signal source 24 and the display 22 of FIG. 1, the remaining components performing the functions of the correction unit 26 and the timing unit 28. As shown in FIG. 5, the system 20 comprises the memories 86 which store the correction signals as has been described with reference to FIG. 4, the system 20 further comprising a clock 90 and an address generator 92 which function in the same manner as the clock 62 and the generator 64 of FIG. 4 for addressing the memories 86. The system 20 further comprises three digital-to-analog converters 94, three multipliers 96, three summers 98, three differential amplifiers 100 and a source 102 of reference voltage.

In operation, the correction signals of the respective memories 86 are converted from digital to analog format by the converters 94 and applied to the multipliers 96. The multipliers 96 are analog mutlipliers, and are readily available commercially. The multipliers 96 serve to scale the correction signals prior to the combining of the correction signals with the video signals at the summers 98. The summers 98, which may be summing amplifiers, sum the scaled correction signals with the video signals, and apply the sums as input signals to the display 22. It is noted that each of the video signals is separately treated; thus, the red video signal is combined with a scaled correction signal from the red memories 86. Similarly, the green and blue video signals are combined with scale correction signals from the green and blue memories 86, respectively. The source 24 may be a memory, or camera, or other suitable source of video signals which is operable in response to clock pulses from the clock 90. Thereby, the operation of the source 24 is synchronized with that of the address generator 92 by the clock 90. This synchronization insures that the video signals from each site of an image are combined with the correction signals stored at the corresponding locations in the corresponding memories 86.

The scale factors are developed by the differential amplifiers 100, the output terminals of which are coupled to respective ones of the multipliers 96. Each differential amplifier has a positive input terminal and a negative input terminal, the positive input terminals of the amplifiers 100 being connected together and to the source 102 for receiving a predetermined level of voltage.

As has been noted above, in the absence of the video signals, the display 22 presents maximum brilliance. Accordingly, the value of the reference voltage of the source 102, as multiplied by the respective correction signals, is of the appropriate value to provide the foregoing maximum brilliance.

The video signals are connected to the negative input terminals in respective ones of the differential amplifers 100. In the event that the video signals are increased in amplitude to the point where equality is obtained with the reference signal of the source 102, then the amplifiers 100 output a value of zero to the multipliers 96 which, in turn, output values of zero to the summers 98. Accordingly, under the foregoing condition, the values of the input signals presented to the display 22 are equal to the values of the red, green, and blue video signals of the source 24. These values of the video signals reduce the energies of the electron beams of the guns 38 (FIGS. 2 and 4) sufficiently for darkening the display 22. Accordingly, the reference of the source 102 is also of the appropriate value for attaining the dark current.

In the event that the video signals are all of zero value, all three scale factors provided by the amplifiers 100 are equal and, accordingly, the correction signals are applied, apart from a common scale factor, to the input terminals of the display 22. Since the video signals are of zero value, they provide no contribution to the correction signals at the summers 98. Thus, the display 22 is illuminated, essentially, by the red, green, and blue correction signals. This corresponds to the case in FIG. 4 wherein the white screen 32 was used to generate the correction signals. Thus, in the absence of any video signals in FIG. 5, the bright white display is fully corrected for variations in uniformity of color and brightness. In the cases where video signals are present to reduce the intensities of the electron beams of the guns 38, the contributions of the correction signals are reduced by the reduced scale factors of the amplifiers 100. And, as has already been noted, at maximum video amplitude sufficient for darkening the display, the contribution of the correction signals is zero. Thereby, it is seen that the contribution of the correction signals follows an inverse relationship to the amplitudes of the video signals.

The foregoing description has presented a system which incorporates the invention to compensate for nonuniformities in a color CRT display so as to correct the resulting image. The resulting image is thus a true representation of the data provided by the video signals and is free of nonuniformities which would be introduced, otherwise, into the displayed image. The correction sigals are generated by the photographing of a bright white display wherein all of the primary colors, namely the red, green, and blue, are present. The correction signals are attained as a function of location upon the face of the display with the result that the totality of the stored correction signals includes information as to nonuniformities in the display. In addition, the camera utilized in photographing the display is also calibrated by the initial photographing of a uniformly white subject. The calibration signals of the camera are used as reference signals for normalizing the correction signals so as to be free of any perturbations or nonuniformities which might have been present in the camera. Thereby, the correction signals are of true representation of a white image of the display at maximum intended brilliance. The scaling of the correction signal, as provided by the invention, permits a maximum amount of correction signal to be present at the input terminals of the display in the absence of the video signals, with progressively smaller amounts of correction signal being combined with the video as the video signals increase. Thereby, the correction signals are useful over a range of varying intensity of displayed image.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A CRT display compensation system for correction of nonuniformity comprising:
   a. means for storing correction signals as a function of primary color and as a function of location on a screen of said display;
   b. means for combining the correction signals with video display signals employed in driving electron guns of said display; and
   c. means coupled between said storing means and said combining means for altering the values of said correction signals in inverse proportion to the magnitudes of the video display signals.

2. A system according to claim 1 wherein said altering means includes means for subtracting a video display signal from a brightness reference signal, and means driving by said subtracting means for scaling a corresponding correction signal.

3. A system according to claim 2 wherein said combining means comprises a summing circuit.

4. A system according to claim 3 wherein the correction signal for a given location on said screen for any one primary color has a magnitude equal to the logarithm of the ratio of a signal representing the intensity of said one color at a predetermined brightness and a color reference signal, said ratio being dependent on the given location on said screen.

5. A system according to claim 4 wherein said color reference signal is obtained by generating a video signal corresponding to a reference subject.

6. A system according to claim 5 wherein the value of said signal representing the intensity of said one color at a predetermined brightness depends on the given location on said screen, said system further comprising logarithmic circuitry for obtaining said logarithm of said ratio by subtracting logarithmic values of said color reference signal from logarithmic values of said signal representing the intensity of said one color at a predetermined brightness.

7. A system for correction of nonuniformity of color and brightness in a CRT display comprising:
   a. means for storing correction signals as a function of primary color and as a function of location on a screen of said display, said correction signals being obtained from video signals corresponding to the appearance of said screen under separate illuminations of a plurality of primary colors;
   b. means responsive to a reference signal of predetermined value and to a set of video display signals used in exciting said display for scaling the magnitudes of said correction signals in accordance with a difference between each of said video display signals and said reference signal to provide a set of scaled correction signals, there being one scaled correction signal for each primary color, the values of the individual correction signals varying with a given location on the screen of the display; and c. means for combining the scaled correction signals with the video display signals to compensate for the effects of nonuniformity, thereby correcting the nonuniformity.

8. A system according to claim 7 further comprising means for adjusting said correction signals to compensate for any nonuniformities in a camera utilized to generate said video signals corresponding to the appearance of said screen.

9. A system according to claim 8 wherein said scaling means includes means for subtracting a video display signal from said reference signal, said subtracting means and said combining means cooperating to provide an inverse relationship between the magnitudes of said video display signal and a corresponding correction signals.

* * * * *